United States Patent
Weston et al.

(10) Patent No.: US 11,565,655 B2
(45) Date of Patent: Jan. 31, 2023

(54) ACTIVE WHEEL THEFT PREVENTION

(71) Applicant: Ford Global Technologies, LLC, Dearborn, MI (US)

(72) Inventors: Keith Weston, Canton, MI (US); Brendan Diamond, Grosse Pointe, MI (US); Jonathan Hair, Royal Oak, MI (US); Jordan Barrett, Milford, MI (US); Andrew Lewandowski, Sterling Heights, MI (US); Michael Mcnees, Flat Rock, MI (US)

(73) Assignee: Ford GLobal Technologies, LLC, Dearborn, MI (US)

(*) Notice: Subject to any disclaimer, the term of this patent is extended or adjusted under 35 U.S.C. 154(b) by 0 days.

(21) Appl. No.: 17/362,049

(22) Filed: Jun. 29, 2021

(65) Prior Publication Data

US 2022/0410839 A1 Dec. 29, 2022

(51) Int. Cl.
*B60R 25/09* (2013.01)
*B60R 25/08* (2006.01)
*B60R 25/10* (2013.01)
*B60R 25/34* (2013.01)
*B60R 25/30* (2013.01)
(Continued)

(52) U.S. Cl.
CPC .............. *B60R 25/09* (2013.01); *B60R 25/08* (2013.01); *B60R 25/1012* (2013.01); *B60R 25/245* (2013.01); *B60R 25/305* (2013.01); *B60R 25/34* (2013.01); *G07C 9/00309* (2013.01);
(Continued)

(58) Field of Classification Search
CPC ..... B60R 25/09; B60R 25/08; B60R 25/1012; B60R 25/245; B60R 25/305; B60R 25/34; B60R 2025/1013; G07C 9/00309; G07C 2009/00984
See application file for complete search history.

(56) References Cited

U.S. PATENT DOCUMENTS 7,378,988 B2 * 5/2008 Nordbruch ........... B62D 15/027
340/440
10,131,362 B1 * 11/2018 Gingrich .................. G07C 5/00
(Continued)

FOREIGN PATENT DOCUMENTS

| CN | 106808917 A | 6/2017 |
|---|---|---|
| CN | 107107868 A | 8/2017 |
| JP | 2006076546 A | 3/2006 |

OTHER PUBLICATIONS

David Beaudrie, "Get Car Smart By Protecting Your Tires and Wheels", The Spruce, Dotdash Publishing Co., Mar. 27, 2020, 5 pages.

*Primary Examiner* — Nay Tun
(74) *Attorney, Agent, or Firm* — Frank Lollo; Eversheds Sutherland (US) LLP (57) ABSTRACT

A vehicle includes a first sensor that senses a state of the vehicle and a second sensor that senses outside of the vehicle. A computing device is configured to receive signals from the sensors and to control rotating and turning of the wheels. While the vehicle is parked, the computing device determines according to a signal received from the sensors, that a condition is satisfied. The condition may be associated with a particular wheel. Based on determining that the condition is satisfied, and while the vehicle remains parked, the computing device initiates automatically rotating or turning the particular wheel associated with the condition.

18 Claims, 4 Drawing Sheets

(51) Int. Cl.
  *G07C 9/00* (2020.01)
  *B60R 25/24* (2013.01)
(52) U.S. Cl.
  CPC ........... *B60R 2025/1013* (2013.01); *G07C 2009/00984* (2013.01)

(56) References Cited

U.S. PATENT DOCUMENTS

| | | | | |
|---|---|---|---|---|
| 10,232,673 | B1* | 3/2019 | Lavoie | B60C 23/0479 |
| 10,525,881 | B1* | 1/2020 | Deshpande | B60Q 9/001 |
| 10,773,694 | B2* | 9/2020 | Goodman | B60R 25/102 |
| 10,775,781 | B2* | 9/2020 | Elangovan | G05D 1/0016 |
| 11,149,656 | B1* | 10/2021 | Diamond | H02K 37/24 |
| 11,247,637 | B1* | 2/2022 | Angelillo | B60R 25/40 |
| 2005/0273236 | A1* | 12/2005 | Mori | B60T 8/1755 |
| | | | | 701/41 |
| 2006/0036361 | A1* | 2/2006 | Romer | B60W 30/18172 |
| | | | | 701/87 |
| 2007/0008083 | A1* | 1/2007 | Berg | B60K 28/066 |
| | | | | 340/425.5 |
| 2007/0103279 | A1* | 5/2007 | Hayashi | B60R 25/1004 |
| | | | | 340/426.25 |
| 2011/0172863 | A1* | 7/2011 | Yu | B60W 20/10 |
| | | | | 180/65.285 |
| 2011/0276225 | A1* | 11/2011 | Nefcy | B62D 15/027 |
| | | | | 701/41 |
| 2013/0116892 | A1* | 5/2013 | Wu | B60R 25/09 |
| | | | | 701/45 |
| 2015/0197254 | A1* | 7/2015 | Wysietzki | B60W 40/10 |
| | | | | 701/41 |
| 2018/0273092 | A1* | 9/2018 | Engels | B60W 30/06 |
| 2020/0001828 | A1 | 1/2020 | Loeffler et al. | |
| 2020/0247382 | A1* | 8/2020 | Chang | B60T 17/221 |
| 2020/0283012 | A1* | 9/2020 | Kozak | G08G 1/166 |
| 2021/0179083 | A1* | 6/2021 | Hara | B60W 10/20 |
| 2021/0331516 | A1* | 10/2021 | Blanco Barrera | B60B 7/16 |

* cited by examiner

ACTIVE WHEEL THEFT PREVENTION

BACKGROUND

Vehicles have long been equipped with anti-theft systems. Previous anti-theft systems have been designed to prevent theft of a vehicle. Digital keys, alarms, lockdown modes, global positioning system (GPS) beaconing, and other anti-theft measures can be effective in preventing vehicle theft. However, wheel theft remains problematic. The market for stolen wheels is robust since most wheels are not serialized and wheel purchasers do not usually ask for proof of ownership.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments discussed below relate to a vehicle that includes a first sensor that senses a physical state of the vehicle and a second sensor that senses outside of the vehicle. A computing device is configured to receive signals from the sensors and to control rotating and turning of the wheels. While the vehicle is parked, the computing device determines according to the signals received from the sensors, that a condition is satisfied. The condition may be associated with a particular wheel. Based on determining that the condition is satisfied, and while the vehicle remains parked, the computing device initiates automatically rotating or turning the particular wheel associated with the condition.

Illustrative Embodiments

Figure 1:
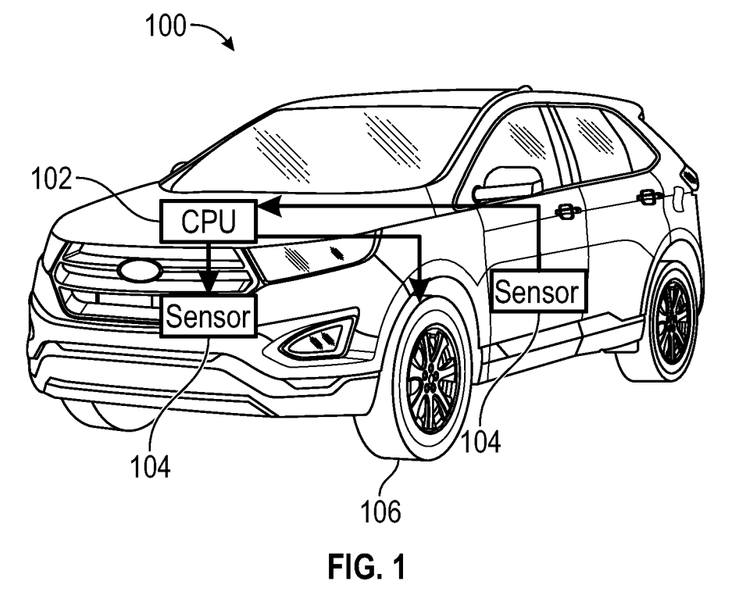
FIG. 1 shows a vehicle in accordance with one or more embodiments of the disclosure.

FIG. 1 shows a vehicle 100. The vehicle 100 includes a computing device 102, sensors 104, and wheels 106. The computing device 102 is operationally connected with the sensors 104, the wheels 106, and other components of the vehicle (not shown) such as an anti-lock brake system (ABS), motors that rotate (apply torque) to the wheels, servos for turning (steering) the wheels 106, etc. The computing device 102 may be a general-purpose computing device, as discussed below with reference to FIG. 4. The computing device 102 is arranged to receive signals from the sensors 104, either directly or via various subsystems of the vehicle 100, for instance from the ABS system, a driver-assist (DA) module that assists or automates driving, or the like. The sensors 104 may be of one or more types, such as cameras, pitch/roll sensors, headlight level sensors, accelerometers, ultrasonic sensors, Lidar sensors, Radar sensors, capacitive sensors, or any other sensor for sensing movement and orientation of the vehicle and/or for sensing objects around the vehicle 100. In some embodiments, ultrasonic sensors and/or cameras are arranged to sense near the wells of the wheels 106. Any set of sensors 104 may be used that allow algorithms executing on the computing device 102 to determine, from the sensors, the occurrence of conditions that correlate with a wheel 106 being targeted for theft. For instance, possible theft may be inferred by sensing elevation of the vehicle or wheel, free-rotatability of the wheel 106, a person near the wheel 106, shaking of the vehicle 100, or the like. Detection of threat conditions correlated with potential wheel theft, and wheel theft countermeasures, are discussed further below.

Figure 2:
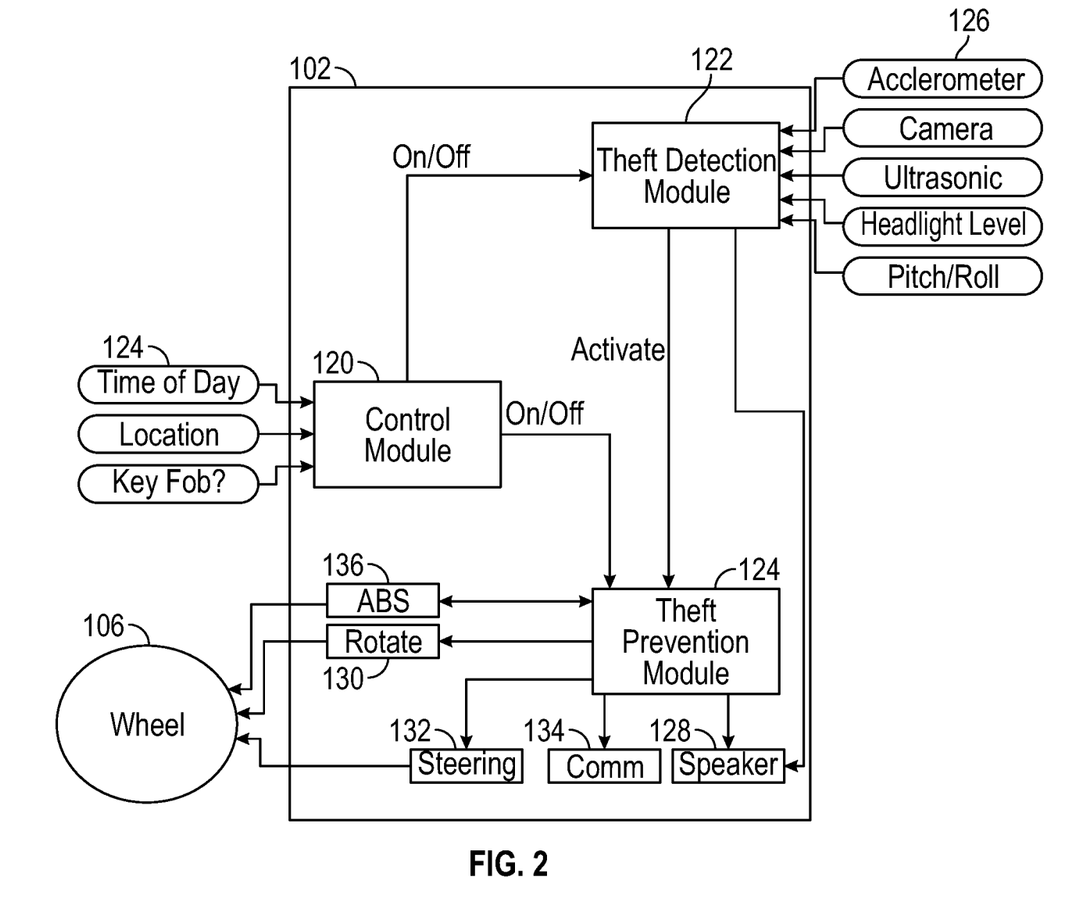
FIG. 2 shows an example system design in accordance with one or more embodiments of the disclosure.

FIG. 2 shows an example system design. A control module 120, theft detection module 122, and theft prevention module 124 execute in concert on the computing device 102. The control module 120 oversees execution of the theft detection module 122 and the theft prevention module 124. The modules may be implemented as threads or processes and may communicate using known inter-process communication mechanisms. The control module 120 receives inputs 124 relevant to determining whether wheel security should be active. Such inputs 124 may include time of day, GPS (geo-positioning system) location, indications of key fob presence or absence, a signal of entering a park mode or a security mode, a maintenance-mode signal or the like, discussed below. The control module 120 uses the inputs 124 to determine when the security system should be active or inactive. As discussed next, the control module 120 controls the theft detection module 122 and the theft prevention module 124 and may activate or deactivate either at any time.

By default, the security system is off and neither the theft detection module 122 nor the theft prevent module 124 are activated by the control module 120. When a trigger event is received by the control module 120, the control module 120 determines whether to activate the theft detection module 122. The trigger event may be a signal provided by the vehicle 100 entering a park mode, a signal from a key fob system indicating that the key fob is no longer present, a manually initiated "on" signal, or the like. In one embodiment, when the trigger event is received, the control module 120 activates the security system based only on the trigger event. In another embodiment, the control module 120 includes logic to allow other factors to override activation of the security system when a trigger event is received (or to de-activate the security system). For example, a cloud service may manage geofenced exclusion areas corresponding to places such as service stations, low-crime areas, user-defined areas, etc. In this embodiment, the vehicle's GPS location is provided to the service and the service determines if the vehicle location is in an exclusion area. If so, the service informs the control module 120 and the control module 120 determines to not activate the security system when a trigger event is received. The control module 120 or the cloud service might also determine if the time of day is within a window during which wheel theft is unlikely, e.g., during daylight hours, and accordingly instruct the control module 120 to not activate the security system. Another override condition might be that the vehicle is in a service mode.

If the control module 120 receives a trigger event for deactivation of the security system, for instance a message indicating that the key fob has become present, that an override condition has become active (e.g., time of day is within daylight hours), or that a service mode has been activated, then, the control module 120 will communicate with the theft detection module 122 and the theft prevention module 124 to turn off sensor-based theft detection and to disable any active security measures such as a braked wheel, a turned wheel, or a rotating wheel.

The theft detection module 122 receives sensor signals 126 as discussed above. When activated, the theft detection module 122 uses the sensor signals to determine whether to invoke the theft prevention module 124. Note that the theft detection module 122 does not detect theft per se, but rather conditions that are correlated with likely wheel theft. As used herein, "theft detection" refers to detecting conditions correlated with possible theft. Techniques for determining that the theft prevention module 124 should be activated are discussed below with reference to FIG. 3.

In one embodiment, the theft detection module 122 sets a timer when the sensor signals 126 meet one or more conditions that correlate with theft of a wheel or wheels. That is to say, the theft detection module 122 determines that a wheel needs protection based on the sensor signals 126, as discussed below, and starts the timer for a warning period before physical countermeasures are activated. At the same time, the theft detection module 122 may play a warning to a loudspeaker 128 of the vehicle. The theft detection module 122 continues to monitor the sensor signals 126 and if the sensor signals 126 stop meeting the theft condition before the timer runs its course, then the theft detection module 122 reverts to monitoring the sensor signals 126 and the theft prevention module 124 is not activated. Note that while the timer is running, the control module 120 can potentially turn off the theft detection module 122, in which case the timer is cancelled. However, if sufficient time passes and the detected threat persists, the theft detection module 122 responds by instructing the theft prevention module 124 to implement countermeasures. The theft detection module 122 may or may not inform the theft prevention module 124 which wheel (or wheels) have been determined to be potential theft targets; in some embodiments, the theft prevention module 124 detects or confirms which wheels are to be protected.

When the theft prevention module 124 is invoked, the module may take a variety of steps to detect statuses of wheel(s) and to secure threatened wheels while the vehicle remains parked. Securement measures can include (i) turning (steering) a wheel to make it difficult for a thief to access all of the lugs on the wheel with a tool, (ii) rotating a wheel, (iii) automatically driving the vehicle 160, or (iv) sending alert messages to a party associated with the vehicle. Note that the securement measure or measures selected for a particular wheel may depend on the status of that wheel. For example, if a wheel is steerable, then turning of the wheel may be selected. If a wheel is determined to be freely rotatable (e.g., from ABS feedback), then rotating the wheel may be selected. Multiple actions may be taken to secure a wheel.

For securement and for determining status of a wheel, such as whether it is rotatable or aloft, the theft prevention module 124 has interfaces to various vehicle systems and sensors, such as the power/drive system 130 (which can apply torque to the wheels), the steering system 132 (which controls servos to turn/steer the wheels), a communication system 134 (to send notifications of the detected potential theft), the loudspeaker 128 (to sound an alarm or warning), etc. The theft prevention module 124 may also communicate bidirectionally with the ABS 136. The ABS 136 may be used to determine if a wheel is free-spinning (i.e., not meeting resistance from the ground). The ABS 136 can also be instructed to apply brakes for any wheels that are not free-spinning. The theft prevention module 124 can instruct the steering system 130 to turn (steer) wheels to a maximum extent possible, which can make it impossible for tools to access some lug nuts due to wheel well obstruction. Another possible countermeasure is to continuously waggle steerable wheels.

The division of functionality between the security modules shown in FIG. 2 is for convenience. Other designs may be used. Moreover, as noted above, the control module 120 can deactivate the theft detection module 122 and the theft prevention module 124. If the theft prevention module 124 is deactivated by the control module, or if the theft detection module 122 reports that securement is no longer needed, then the theft prevent module 124 may reverse or halt its securement measures, for example straightening a turned wheel, stopping rotation of a wheel, disengaging a brake, etc. In an embodiment, the security system may be implemented as part of a driver-assist system, which may provide ready access to sensor data and vehicle control mechanisms. In another embodiment, the security system interfaces with a driver-assist system to receive the requisite inputs and to issue the relevant wheel securing commands.

Figure 3:
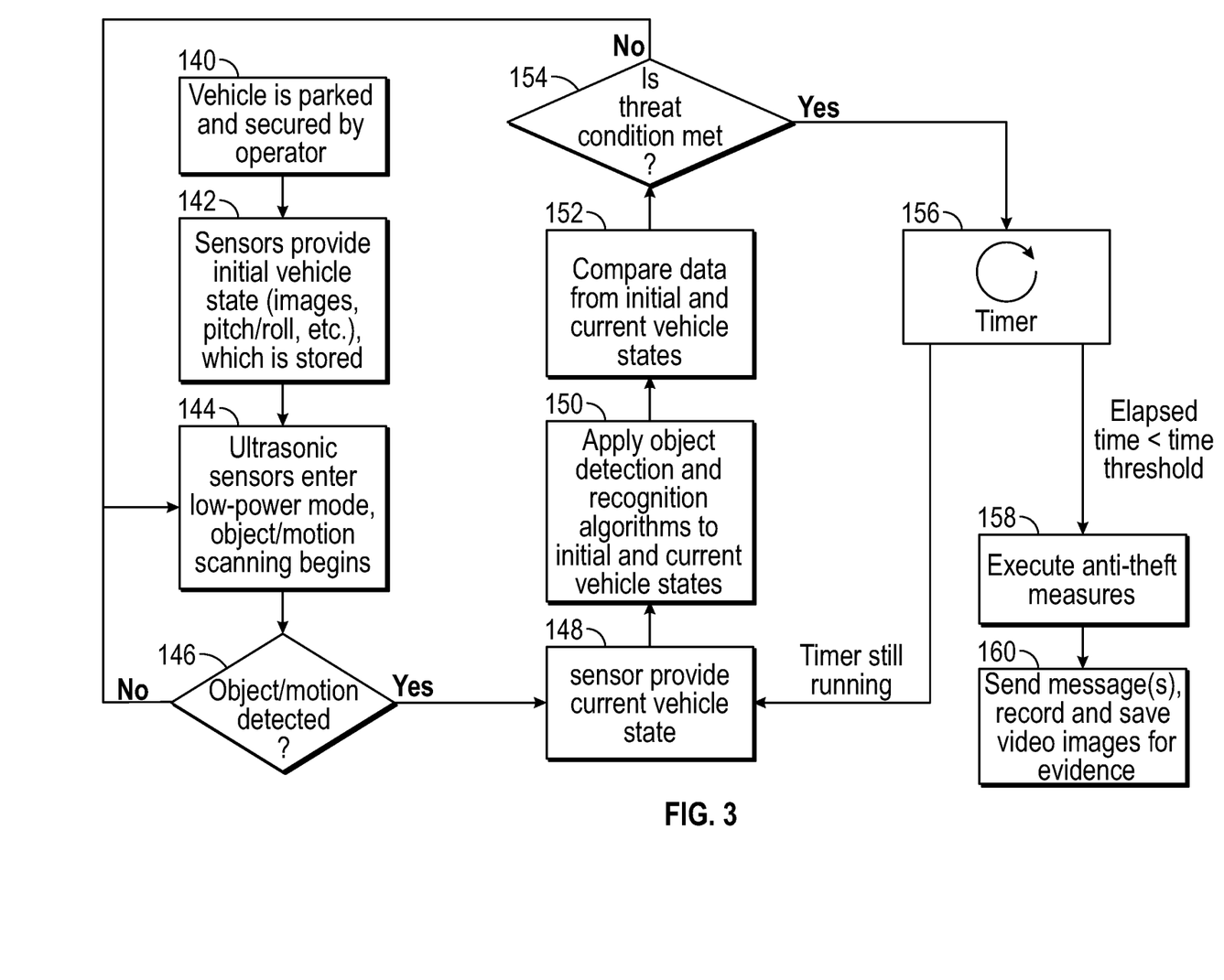
FIG. 3 shows a process for detecting and preventing theft of a vehicle wheel in accordance with one or more embodiments of the disclosure.

FIG. 3 shows a security process for detecting and preventing theft of a vehicle wheel. In this embodiment, power consumption may be kept low by using ultrasonic sensors to determine whether to perform a more robust threat-detection analysis. However, as will be discussed below, other approaches may be used to determine whether to initiate theft countermeasures. At step 140 an initiation event starts the security process. The trigger event may be the vehicle entering a park mode or a manually initiated security mode (activated remotely or with a key fob), among other possibilities. At step 142, an initial vehicle state is captured from one or more of the vehicle sensors. The initial vehicle state may include sensings of surroundings of the vehicle, for instance images or ultrasonic readings. The initial vehicle state might also include readings of sensors that sense the vehicle's orientation in space (e.g., pitch and roll). As will be explained later, the initial vehicle state is used to detect threat-related changes in state of the vehicle or its surroundings.

After step 144 the process enters a monitoring and prevention loop. An initial condition to determining whether countermeasures are to be taken involves monitoring ultrasonic sensors. At step 146 an ultrasonic reading is checked to detect the presence of an object or motion (possibly within a threshold distance of a wheel). If no object or motion is detected, then step 146 repeats; after a brief delay ultrasonic sensing recurs. However, if step 146 determines that an object or motion is present, then additional conditions are checked. Specifically, at step 148 the vehicle sensors are again read to capture the current vehicle state. At step 150, if cameras are used, object detection and/or recognition is performed on the initial and current images.

At step 152, the initial and current vehicle states are compared, and at step 154 a corresponding threat condition is checked to determine whether to initiate countermeasures. Specifically, if object recognition/detection has been performed, then initial vehicle state objects are compared to new vehicle state objects to determine if an object or person is present. Similarly, initial and current ultrasonic readings may be compared to determine that an object has become present. A wide range of threat-detection techniques are possible, depending on the types of sensors that are available and the amount computing power to be used. In some embodiments, only ultrasonic or image-based object detection is used. In other embodiments, object recognition is used. That is, if an object near a wheel well is recognized as a person, then step 154 may decide that a threat condition has been met. It is not necessary to determine that an object is near a wheel well per se; it may suffice that an object is newly present in the vicinity of the car, i.e., is within sensor range or is within a threshold distancer of the vehicle. However, a wheel-well proximity condition may provide added accuracy.

In embodiments that sense orientation (pitch/roll) of the vehicle, similar initial-current comparisons may be made. If the orientation of the vehicle has changed then step 152 may initiate countermeasures. Orientation-change conditions may correlate to changes in elevation of a corner, side, or end of the vehicle. At the same time, if step 154 has previously determined that a threat condition has been met, then a time threshold for a warning timer, discussed below, can be adjusted to speed up the activation of theft countermeasures.

Some embodiments may not capture and compare an initial vehicle state. Rather, current vehicle state is monitored to determine whether countermeasures are to be initiated. Detecting and recognizing a person (possibly within a given distance) may serve as a sufficient condition. In another embodiment, if an accelerometer sensor detects motion of the vehicle, then a threat may be determined to be present. Combinations of the threat conditions discussed above may be used to determine whether to initiate countermeasures (i.e., whether step 154 is "yes"). For example, a probability of an orientation change may be given a first weight, a probability of an object (or person) near a wheel well might be given a second weight, and a probability of vehicle motion may be given a third weight. If a sum of the weights exceeds a threshold then then step 154 determines that a threat condition is met. Alternatively, a chain of conditions may be used instead. For example, only when an object is detected is the accelerometer sensed and/or a change in orientation of the vehicle checked. If either of the second conditions are met then countermeasures are initiated. Or, a change in orientation may always be a sufficient threat condition, regardless of whether other conditions are to be checked.

In sum, at step 154 vehicle sensors of one or more types are read and the signals therefrom are used to determine whether to initiate wheel theft countermeasures, as discussed next. If step 154 does not determine that a threat condition is met then control flows to step 144. However, if step 154 determines that a threat condition has been met as discussed above, then control flows to step 156.

Step 156 initiates a timer if one is not already running A timer is used to provide a warning period and to avoid taking physical countermeasures for threat conditions that may be temporary, such as passersby. Step 156 then checks whether elapsed time of the timer has exceeded a time threshold. If not, the threat detecting steps 144-154 are repeated, i.e., control flows to step 148 so that evaluation of threat conditions continues during the warning period. Note that if the timer is already running and step 154 determines that the threat condition is not satisfied then control does not flow back to step 156 and the timer is terminated.

The time threshold controls the amount of time that passes between when a threat condition is detected (when the timer is started) and when countermeasures are taken at step 158. The time threshold may be adjusted dynamically based on factors such as whether a ride height sensor indicates that the vehicle has been lifted, whether the vehicle is experiencing non-zero acceleration (being shaken), whether the pitch or roll of the vehicle has changed within a specified time range, whether other sensors detect other moving objects located near the wells of other wheels, etc. In other words, if additional threat conditions are detected the time before countermeasures are taken may be decreased.

In one embodiment, an audio alarm is played through the vehicle loudspeaker to warn of an impending action such as rotating a wheel, moving the vehicle, etc. Different methods may be used to determine which actions to take for which particular wheels. As noted, a wheel targeted for theft may be identified by sensing an object or motion near the wheel. A wheel targeted for theft might also be identified by sensors on lug nuts or slight changes in air pressure detected by pressure sensors within a tire. A wheel targeted for theft might be identified by measuring feedback from the ABS or from feedback when applying torque to a wheel (i.e., energizing a motor). Feedback can indicate that a wheel is free-spinning and therefore is to be protected. In another embodiment, at step 160, additional responses to a detected threat are taken, for instance storing image data taken by vehicle cameras, sending messages to a vehicle owner, auto service, or authorities, etc.

The process discussed with reference to FIG. 3 may be controlled by the control module 120 as discussed above. That is, if the control module 120 determines that the security system is to be deactivated, the process of FIG. 3 may be terminated at any point and any countermeasures taken may be disabled. For example, the presence of a key fob associated with the vehicle may cause the process of FIG. 3 to be stopped at any step.

In another embodiment, a theft prevention countermeasure involves automated driving of the vehicle. This could include automatically driving the vehicle away from its current location, moving the vehicle back and forth just enough to disrupt wheel theft, positioning the vehicle against a curb or obstruction that can block access to a wheel or the undercarriage (preventing use of a car jack), etc.

Although embodiments above discuss an onboard computer performing theft detection and prevention, any of the steps related thereto may instead be performed by a remote computing service communicating with the vehicle.

Figure 4:
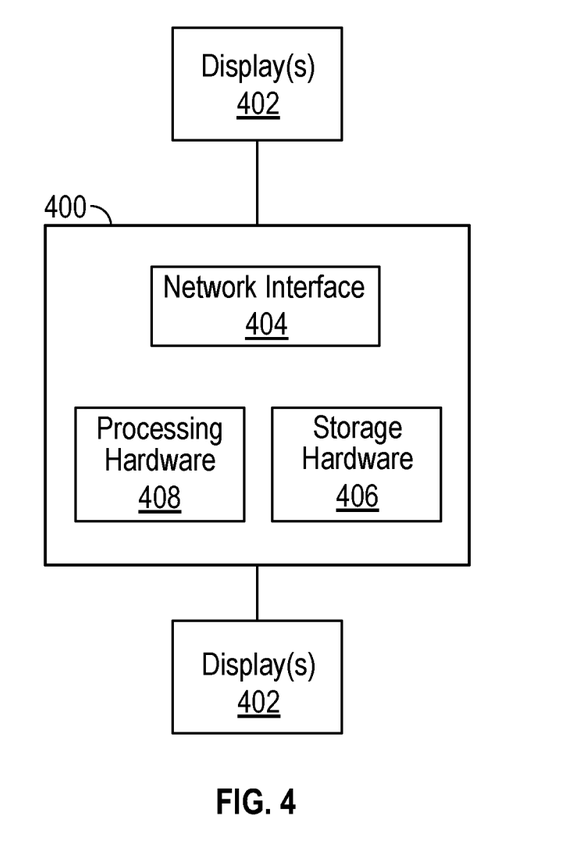
FIG. 4 shows details of a computing device in accordance with one or more embodiments of the disclosure.

FIG. 4 shows details of a computing device 400, one or more of which may execute the embodiments discussed above. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 400 to implement any of the features or embodiments described herein.

The computing device 400 may have one or more displays 402, a network interface 404 (or several), as well as storage hardware 206 and processing hardware 408, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 406 may be any combination of magnetic storage, static memory, volatile memory, non-volatile memory, optically or magnetically readable matter, etc. The meaning of the term "computer-readable storage", as used herein does not refer to signals or energy per se, but rather refers to physical apparatuses and states of matter. The hardware elements of the computing device 400 may cooperate in ways well understood in the art of machine computing. In addition, input devices may be integrated with or in communication with the computing device 400. The computing device 400 may have any form-factor or may be used in any type of encompassing device.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such labels or phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method performed by a computing device in communication with a vehicle, the vehicle comprising a first sensor that senses a state of the vehicle and a second sensor that senses outside of the vehicle, wherein the first sensor comprises a component of an anti-lock brake system that is at least partially operable while the vehicle is parked, the method comprising:
   determining that the vehicle is in a park mode; and
   initiating, based on the vehicle being in the park mode, a protect function, the protect function comprising:
   receiving signals from the first and second sensors;
   identifying, based on the signals, a theft condition associated with a wheel of the vehicle; and
   automatically, based on identifying the theft condition, rotating or turning the wheel while in the park mode.

2. The method according to claim 1, wherein the first and second sensors are configured to sense an orientation of the vehicle, and wherein the wheel is identified based on detecting a change in orientation of the vehicle.

3. The method according to claim 1, further comprising applying a brake to another wheel of the vehicle.

4. The method according to claim 1, further comprising:
   determining, based on the signals, that a threat condition has been met;
   initiating, based on determining that the threat condition has been met, a timer; and
   rotating or turning the wheel when an elapsed time of the timer exceeds a threshold amount of time.

5. The method according to claim 4, wherein the first and second sensors include an accelerometer or a pitch-roll sensor, wherein the signals include a signal from the accelerometer or from the pitch-roll sensor, wherein the signal indicated a non-zero acceleration of the vehicle while in the park mode, and wherein the threshold amount of time is set based on the signal from the accelerometer or the pitch-roll sensor.

6. The method according to claim 1, wherein the protect function is controlled based on determining, from the signals, that an object has become proximate to the wheel.

7. The method according to claim 1, wherein the first and second sensors include a camera, wherein the signals comprise an image, and wherein the method further comprises detecting an object in the image and identifying the wheel based thereon.

8. A vehicle comprising:
   a first sensor that senses a state of the vehicle and a second sensor that senses outside of the vehicle, wherein the first sensor comprises a component of an anti-lock brake system that is at least partially operable while the vehicle is parked;
   wheels configured to rotate and turn;
   a computing device configured to receive signals from the first and second sensors and configured to control rotating and turning of the wheels, the computing device configured to perform a process, the process comprising:
   while the vehicle is parked, determining, according to the signals received from the first and second sensors, that a condition is satisfied, wherein the condition is associated with a particular wheel; and
   automatically, based on determining that the condition is satisfied and while the vehicle remains parked, rotating or turning the particular wheel associated with the condition.

9. The vehicle according to claim 8, wherein the condition comprises a change in orientation of the vehicle while the vehicle is parked, movement of the vehicle while the vehicle is parked, or detection of an object near the particular wheel.

10. The vehicle according to claim 9, the process further comprising automatically rotating or turning the particular wheel based on repeatedly receiving signals from the first and second sensors and repeatedly determining that the condition has remained satisfied for at least a threshold amount of time.

11. The vehicle according to claim 8, wherein one of the signals is received from the anti-lock brake system, and wherein the condition corresponds to the particular wheel being able to spin freely.

12. The vehicle according to claim 8, further comprising sending, based on determining that the condition is satisfied, a message from the vehicle.

13. The vehicle according to claim 8, wherein the computing device is further configured to control the process based on presence or absence of a key fob associated with the vehicle.

14. A method performed by a computing device, the method comprising:
   monitoring, while a vehicle is in a park mode on a surface, signals from sensors of the vehicle;
   determining, based on signals from sensors of the vehicle, that a condition has been met, wherein the condition is correlated with a wheel of the vehicle being elevated from the surface subsequent to entering the park mode;
   automatically, based on the condition being met and while the vehicle remains in the park mode, rotating or turning the wheel;
   determining which wheels of the vehicle are not free to rotate using feedback from an anti-lock brake system of the vehicle;
   activating brakes for the wheels respectively determined to be not free to rotate; and
   determining to rotate or turn the wheel is further based on the feedback from the anti-lock brake system.

15. The method according to claim 14, further comprising, prior to automatically rotating or turning of the wheel, causing the vehicle to emit an audio alarm.

16. The method according to claim 14, further comprising beginning the monitoring based on determining that either (i) the vehicle is not in a service mode, (ii) a key fob associated with the vehicle is not present, (iii) a current time of day satisfies a time condition, or (iv) a location of the vehicle satisfies a location condition.

17. The method according to claim 14, wherein the sensors comprise one or more of: a camera, a pitch-roll sensor, a ride-height sensor, a headlight leveling sensor, and/or an ultrasonic sensor.

18. The method according to claim 14, wherein the sensors comprise a sensor of a lug nut on the wheel.

* * * * *